United States Patent [19]
Lee

[11] Patent Number: 5,579,891
[45] Date of Patent: Dec. 3, 1996

[54] QUICK ARTICLES FEEDING AND ARRANGING MACHINE

[75] Inventor: Alan T. Y. Lee, San Chung, Taiwan

[73] Assignee: Pro Accutech Co., Ltd., Taipei, Taiwan

[21] Appl. No.: 368,496

[22] Filed: Jan. 4, 1995

[51] Int. Cl.[6] .................................................. B65G 47/24
[52] U.S. Cl. .......................................... 198/408; 198/406
[58] Field of Search ..................................... 198/406, 408, 198/409, 418.7, 426, 427, 429, 432

[56] References Cited

U.S. PATENT DOCUMENTS

| | | | |
|---|---|---|---|
| 1,274,930 | 8/1918 | Wood | 198/406 X |
| 2,786,565 | 3/1957 | Eckart | 198/406 |
| 3,075,327 | 1/1963 | Kimble et al. | 198/406 X |
| 3,093,234 | 6/1963 | Janssen, Jr. | 198/408 X |
| 3,197,013 | 7/1965 | Van Der Winden | 198/408 X |
| 3,319,763 | 5/1967 | Van Der Winden | 198/408 |
| 3,901,374 | 8/1975 | Dubuit | 198/407 X |
| 3,998,320 | 12/1976 | Eggert | 198/406 X |
| 4,213,526 | 7/1980 | Graham et al. | 198/408 X |
| 4,223,779 | 9/1980 | Hopkins | 198/408 X |
| 4,265,354 | 5/1981 | Sinnema | 198/406 X |
| 4,629,056 | 12/1986 | Simelunas et al. | 198/409 X |

*Primary Examiner*—D. Glenn Dayoan
*Attorney, Agent, or Firm*—Beveridge, DeGrandi, Weilacher & Young, L.L.P.

[57] ABSTRACT

A compact quick articles feeding and arranging machine readily mounted to two crossly disposed conveyors. The feeding and arranging machine has a feeding unit and an arranging unit. The feeding unit has a motor driven chain on which are disposed a plurality of T-shaped pushing members. The circulating pushing members can push fed articles delivered by an upper conveyor off therefrom into a lower conveyor via the arranging unit. The arranging unit has two curvely contoured guide board and a wedge-shaped central partition board; the articles falling off the upper conveyor are led through the room between the guide boards and the central partition board of the arranging unit and are turned into a vertical position quickly for easy packing and counting on an assembly line.

5 Claims, 5 Drawing Sheets

QUICK ARTICLES FEEDING AND ARRANGING MACHINE

BACKGROUND OF THE INVENTION

The present invention relates to a compact quick articles feeding and arranging machine mainly associated with two crossly disposed conveyors on which to be delivered ring-shaped or circular articles lie flat and are delivered. Those articles can be readily erected into piles for easy counting and packing, making continuous production and packing possible.

Conventionally, in food production industry or manufacturing industry, ring-shaped or circular flat products delivered on a conveyor have to be transmitted via a number of belt sections slantly disposed at different angles with respect to the horizontal plane so that flat-lying articles can be stepwisely delivered from a flat stage via a number of slant stages to an erected stage finally. Those erected articles are easily piled up, counted and packed in an assembly line.

The prior art conveyors have to be arranged in a stepwise manner has the following disadvantages:

1. Such stepwise conveyors are relatively lengthy, causing waste of working hour.
2. Such stepwise conveyors are bulky and take up too much space.
3. The installation of such stepwise conveyors is relatively complicated and difficult.
4. The bulky size of such conveyors makes the working site crowded and the arrangement of the assembly line difficult.

SUMMARY OF THE INVENTION

Therefore, the primary object of the present invention is to provide an improved quick articles feeding and arranging machine which is compact in size and can be easily mounted to any conventional conveyors.

Another object of the present invention is to provide a compact quick articles feeding and arranging machine which can be easily associated with a conventional assembly line.

One further object of the present invention is to provide a compact quick articles feeding and arranging machine which is cheaper than a conventional machine.

BRIEF DESCRIPTION OF THE DRAWINGS

FIG. 1A is an enlarged diagram showing the details of a T-shaped pushing member engaged with a chain;

DETAILED DESCRIPTION OF THE PREFERRED EMBODIMENTS

Figure 1:
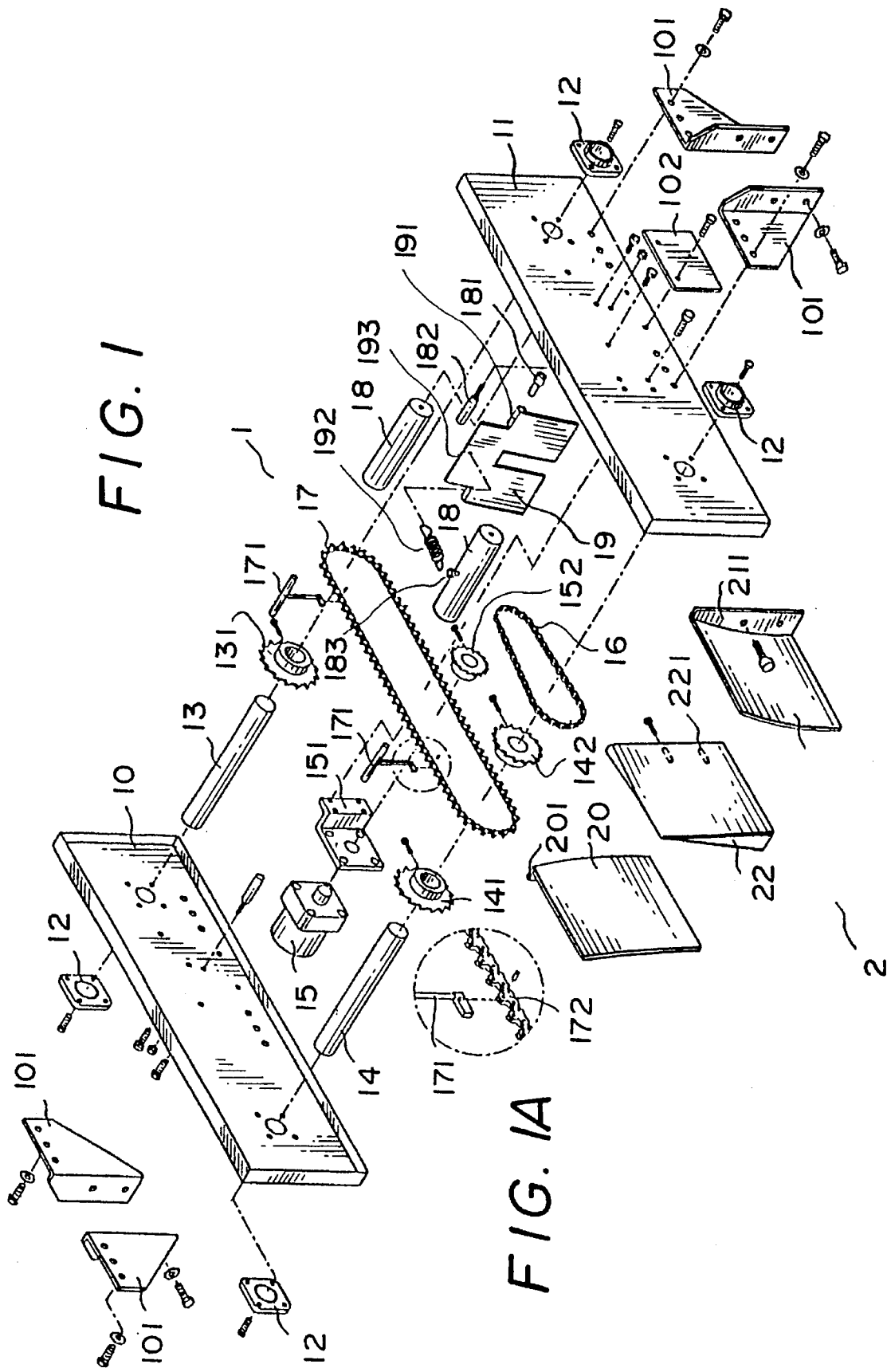
FIG. 1 is a perspective diagram showing the exploded components of the present invention.
Figure 2:
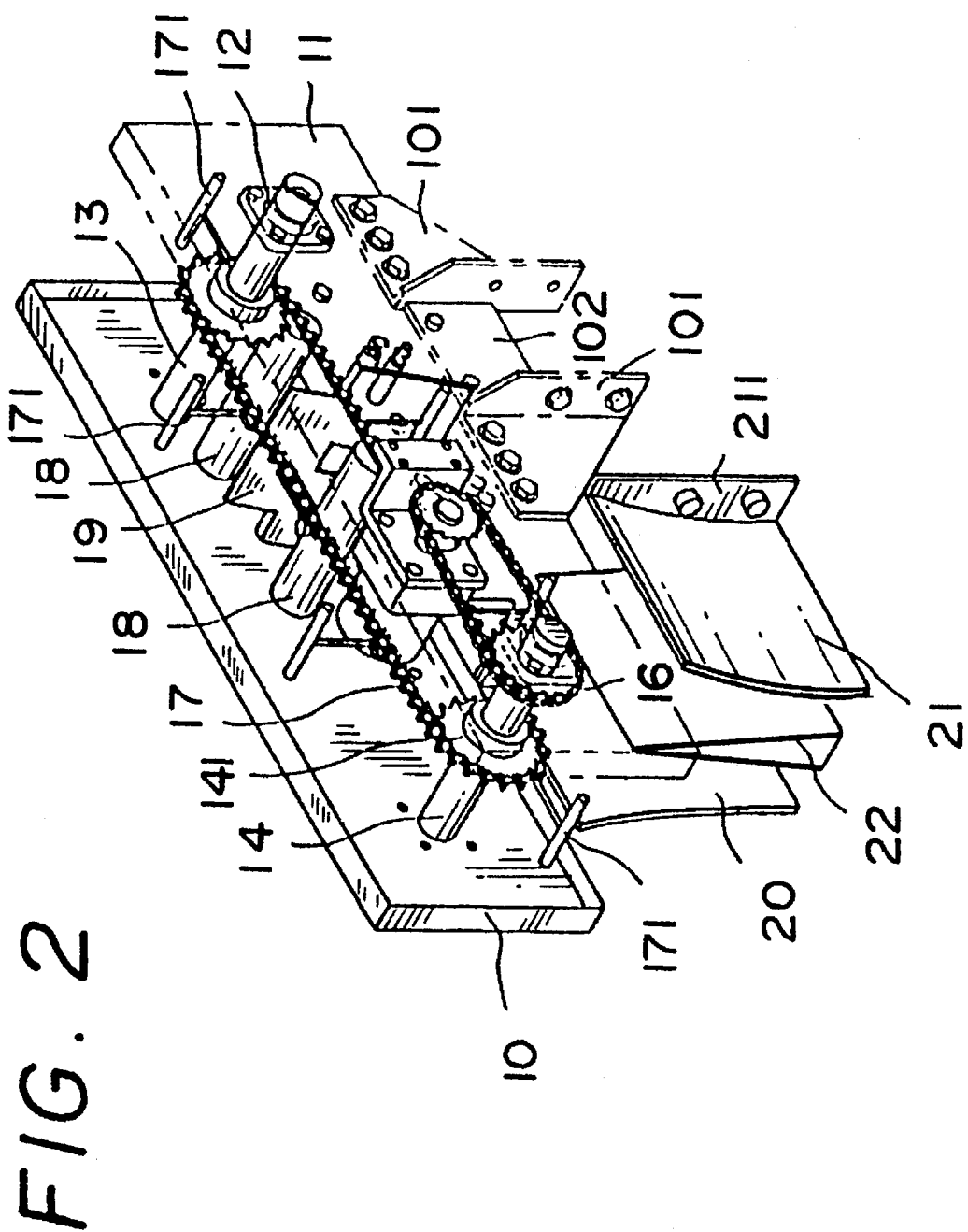
FIG. 2 is a perspective diagram showing the assembly of the quick articles feeding and arranging machine of the present invention.

Referring to FIGS. 1, 2, the compact quick articles feeding and arranging machine of the present invention is comprised of two portions, i.e., a feeding unit 1 and an arranging unit 2.

The feeding unit 1 includes a left and right side boards 10, 11 on which a plurality of fixing holes are disposed, a number of bearings 12, and shafts 13, 14, a motor 15, chains 16, 17, supporting shafts 18 and a pivotal flap 19. To each end of both the left and right side boards 10 is secured the bearing 12. A pair of mounting plates 101 for fixing one side board to a conveyor are secured to the bottom edge of each of the left and right side boards 10, 11 with a stop board 102 sandwiched therebetween for stopping articles delivered by a conveyor.

The shafts 13, 14 are parallelly disposed between the left and right side boards 10, 11 and engaged with the bearings 12 at their ends. At the center of both the shafts 13, 14 is disposed a chain sprocket wheel 131 so that the chain 17 can be in driving engagement with the shafts 13, 14. Another chain sprocket wheel 142 fixed next to the chain sprocket wheel 141 is also mounted onto the shaft 14.

The motor 15 having a chain sprocket wheel 152 disposed at the end of the output shaft thereof. The chain sprocket wheel 142 and the chain sprocket wheel 152 are in driving engagement with each other by a chain 16 so that the power output of the motor 15 can be transmitted to the shaft 14. Simultaneously, the shaft 13 is driven by the chain 17 engaged with the shaft 14.

As shown in FIGS.1, 1A, a plurality of T-shaped pushing members 171 are secured to the periphery of the chain 17. The detail of the securing of the T-shaped pushing members 171 is enlarged in FIG. 1A. The bottom end of a pushing member 171 is riveted to one chain element 172 of the chain 17.

The T-shaped pushing members 171 serve to push stepwisely ring-shaped or circular articles 4 delivered in front of a pivotal flap 19 on a conveyor and stopped by the stop board 102 to fall off the conveyor and into the next arranging unit 2 disposed slightly lower than the conveyor so as to get the articles erected continuously.

A pair of supporting shafts 18 disposed between the shafts 13, 14 are used to keep the distance between the left and right side boards 10, 11 constant. A spring 192 having one end fixed to one supporting shaft 18 by a screw 183 and another end fixed to a through hole 193 of the pivotal flap 19 so that the flap 19 can be retractably actuated. On each side of the flap 19 is disposed a tubular mounting hole 191 engaged with a pivot pin 181 fixed to the side board 10 or 11 respectively.

A pair of stop pins 182 are secured to the left and right side boards 10, 11 at a proper position thereof respectively so as to permit the flap 19 to be slantly disposed.

The arranging unit 2 is made up of a left guide board 20, a right guide board 21 and a wedge-shaped central partition board 22. The left and right guide boards 20, 21 are symmetrically structured and have such a curvature that articles sliding downwardly and passed through between either the left guide board 20 or the right guide board 21 and the central partition board 22 can be smoothly erected when delivered through the arranging unit 2.

Figure 4:
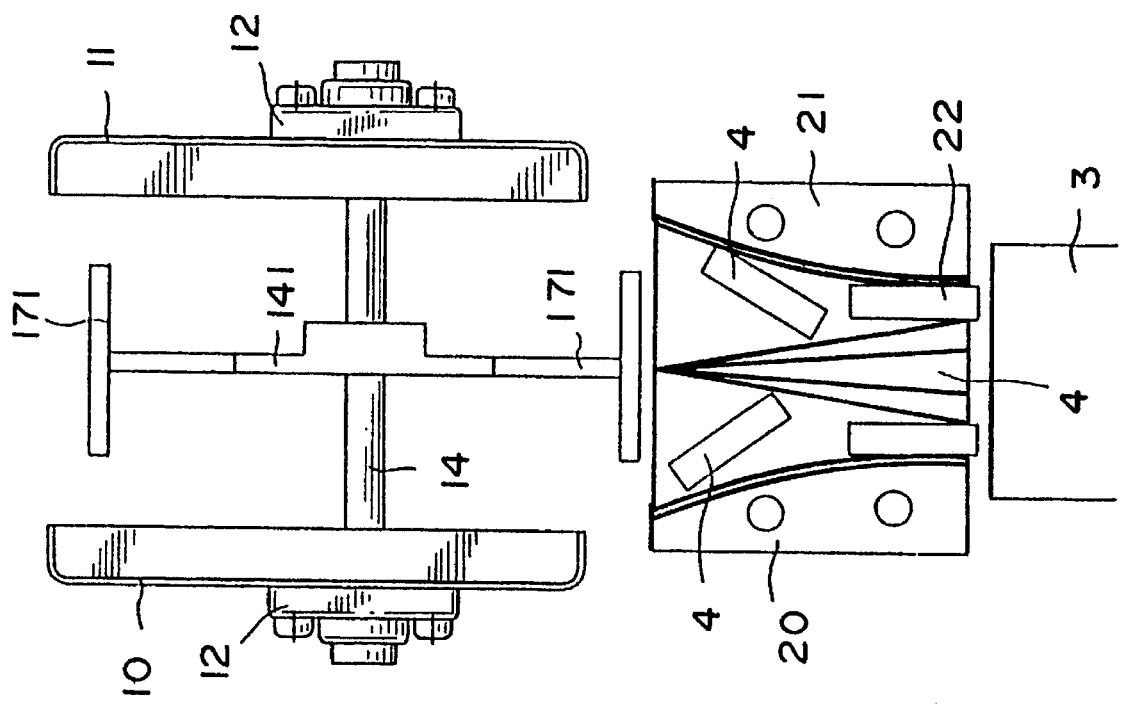
FIG. 4 is a front plane view thereof.

As shown in FIG. 4, one side of the left guide board 20 has a fixing flange 201 and the right guide board 21 is also provided with a fixing flange 211 so that the guide boards 20, 21 can be mounted onto an upper conveyor 3A of a pair of crossly disposed conveyors 3A, 3B. The central partition board 22 is of a wedge shape and has two screw fixing holes 221 so that the central partition board 22 can be fixed to a conveyor.

Figure 3A:
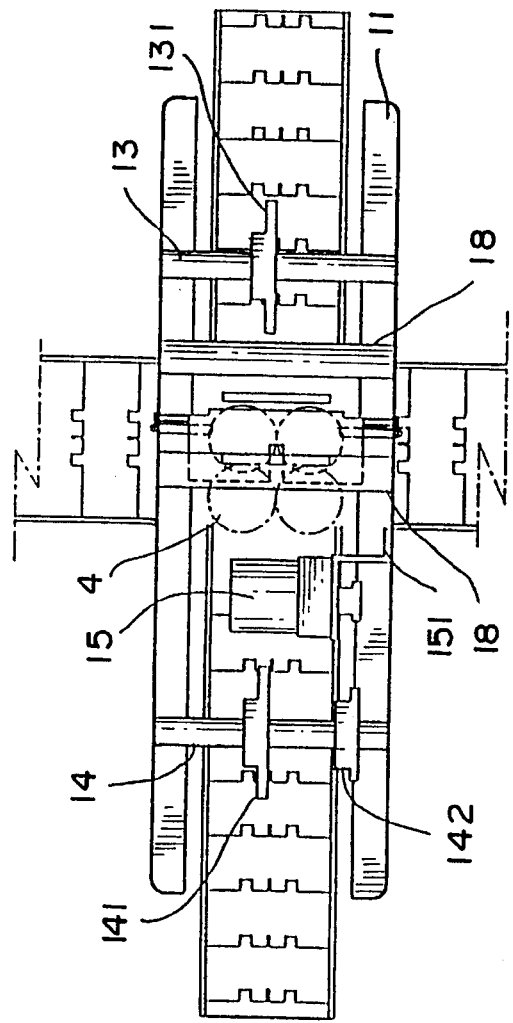
FIG. 3A is a top plane view of the present invention.
Figure 3B:
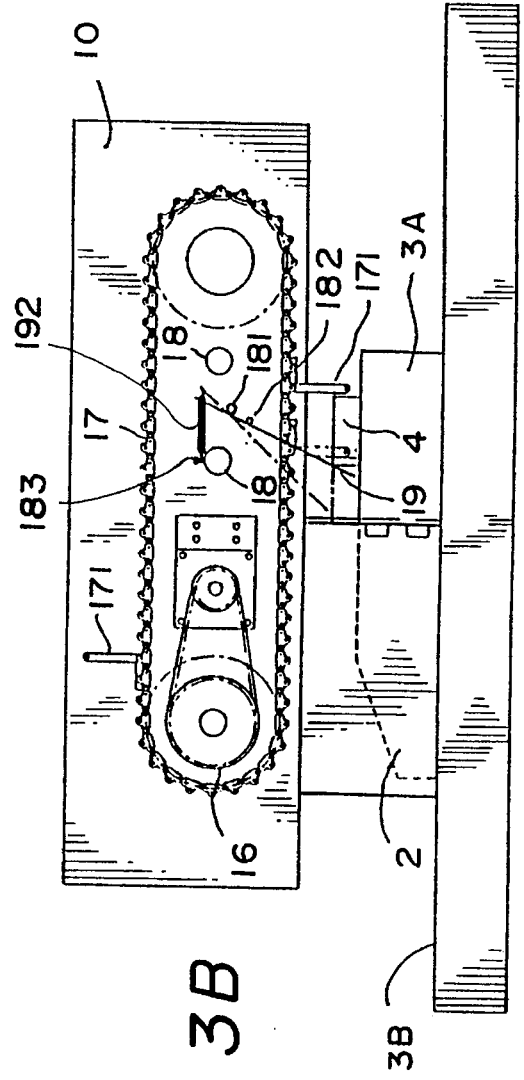
FIG. 3B is a side plane view thereof.
Figure 5:
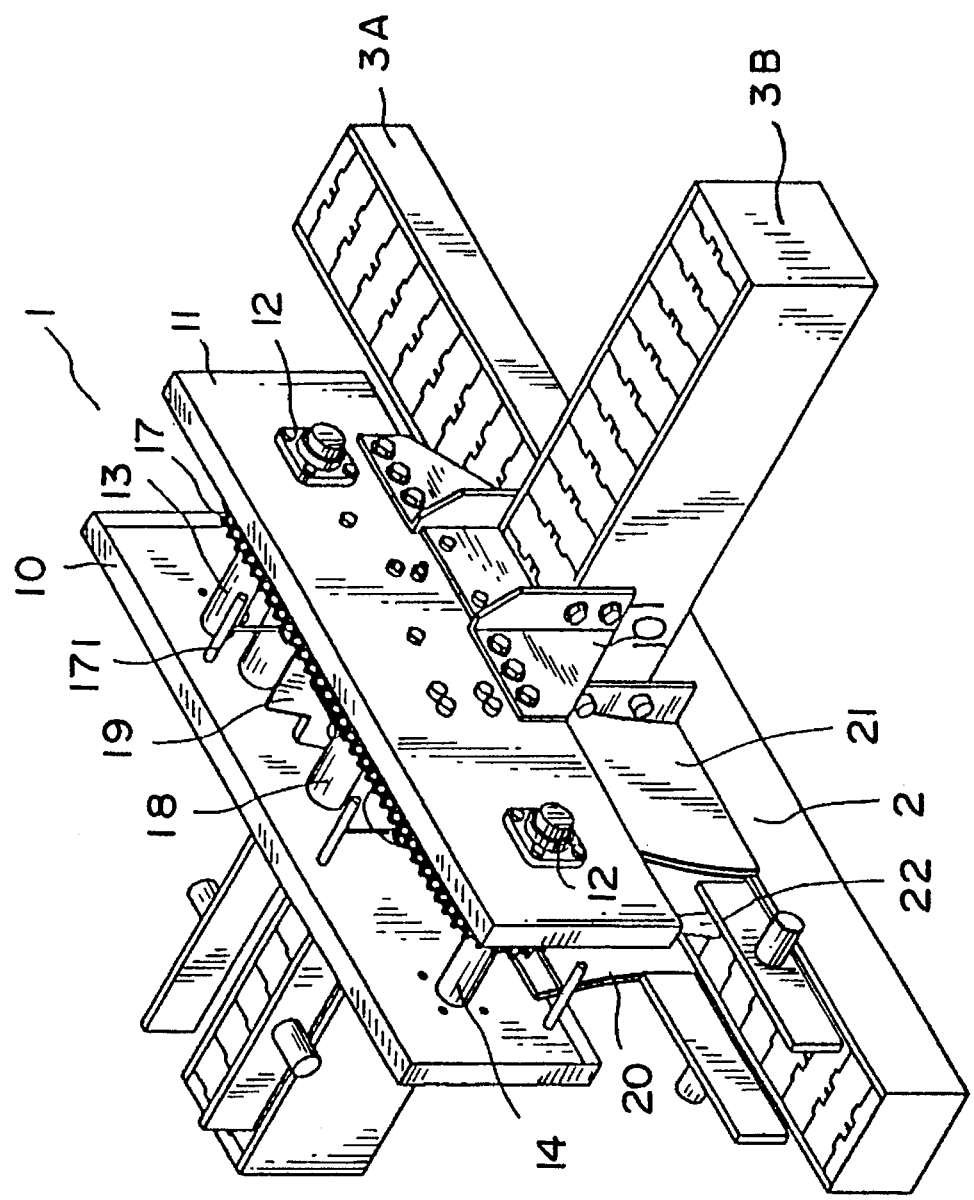
FIG. 5 is a perspective diagram showing the application of the present invention to a pair of crossly disposed conventional conveyors.

Referring to FIGS. 3B, 4, 5, the quick articles feeding and arranging machine of the present invention is disposed at the intersection of the upper and lower conveyors 3A, 3B. One end of the upper conveyor 3A is blocked by the stop board 102 so that flat-lying articles fed into the upper conveyor 3A are delivered to the place between the stop board 102 and the pivotal flap 19 of the feeding and arranging machine of the present invention. In the meantime, the chain 16 engaged with the chain sprocket wheel 152 transmits power from the motor 15 to the chain 17 so that the T-shaped pushing members secured to the chain 17 can push flat-lying articles, against the pivotal flap 19, falling off the upper conveyor 3A and led into the guide boards 20, 21 and the central partition board 22, as shown in FIGS. 3A, 4. The flat-lying articles 4 are accordingly turned into a vertical position and delivered by the lower conveyor 3B continuously whereby articles can be easily accumulated and counted and packed in a continuous manner.

Referring to FIG. 5, the left and right side boards 10, 11 are secured to the sides of the upper conveyor 3A by way of the mounting plates 101. The fixing position of the mounting plate 101 is adjustable according to practical requirements. The left and right guide boards 20, 21 and the central partition board 22 are also secured to one side of the upper conveyor 3A.

It can be clearly seen with the aid of the detailed description in the preceedings that the quick articles feeding and arranging machine of the present invention is characterized by that it is compact in size and can be readily mounted onto any conveyors; and the operation time in an assembly line can be effectively saved; the cost of associated equipment can be reduced tremendously; the installation space can be greatly saved.

I claim:

1. A quick articles feeding and arranging machine mounted onto a pair of crossly disposed conveyors, comprising: a feeding means for continuously pushing flat-lying articles delivered by a conveyor off said conveyor;

an arranging means for converting the flat-lying articles into a vertical position;

said feeding means mounted onto said conveyor having a circulating pushing means for continuously pushing articles delivered by said conveyor off therefrom and fallen into said arranging means;

whereby the flat-lying articles delivered to said feeding means can be turned into a vertically disposed position for easy packing and counting when led through said arranging means.

2. A quick articles feeding and arranging machine as claimed in claim 1 wherein said feeding means comprises:

a left side board and a right side board each having a plurality of fixing holes disposed thereon;

a plurality of mounting plates for fixing said left and right side boards to said conveyor each having one end fixed to one of said side boards and the other end fixed to said conveyor;

a pair of shafts parallelly mounted between said left and right side boards with each supported by a bearing means each fixed to one end of said left or right side board respectively a motor having an output end engaged with a chain driving means;

each said shaft being provided with a chain driving means at the center thereof;

one of said shafts being provided with a second chain driving means;

a first chain engaged with said chain driving means of both said shafts;

a second chain engaged with said chain driving means of said motor and said second chain driving means mounted to one of said shaft so as to permit said motor to drive said shafts to rotate;

a pair of supporting shafts parallelly disposed between said left and right side boards for maintaining the distance thereof constant;

a spring biased pivotal flap mounted between said supporting shafts;

a pair of stop pins in abutment against said pivotal flap for keeping said flap slantly positioned;

said circulating pushing means further comprising a plurality of pushing means engaged with said first chain engaged with said shafts for continuously pushing articles over said pivotal flap and into said arranging means.

3. A quick articles feeding and arranging machine as claimed in claim 1 wherein said arranging means comprises:

a pair of symmetrically disposed guide boards mounted to said conveyor;

a wedge-shaped central partition board disposed between said guide boards and being secured to said conveyor;

each said guide board having an outwardly extended curved section and a vertical flat lower section and a fixing flange for securing to said conveyor;

said arranging means being positioned lower than said conveyor so that said flat-lying articles led through said pivotal flap can be pushed off said conveyor and led through said guide boards, turning said flat-lying articles into a vertical position.

4. A quick articles feeding and arranging machine as claimed in claim 2 wherein said plurality of pushing means are made up of a plurality of spacely disposed T-shaped pushing members, each being secured to one element of said first chain, so that said flat-lying articles on said upper conveyor can be continuously pushed off and which said articles fall into said arranging means to turn from a flat position into a verticle position when led through said guide boards.

5. A quick articles feeding and arranging machine as claimed in claim 3 wherein the curvature of said outwardly extended curved upper section of said guide board is formed in conformance to the shape of articles to be led therethrough and the width between said central partition board and said guide boards is equal to the size of one side article erected in a vertical position plus a tolerance.

* * * * *